United States Patent [19]

Turrisi

[11] Patent Number: 4,528,205

[45] Date of Patent: Jul. 9, 1985

[54] LOW CALORIE SYRUP

[75] Inventor: Lisa Turrisi, Ridgewood, N.J.

[73] Assignee: Lever Brothers Company, New York, N.Y.

[21] Appl. No.: 569,105

[22] Filed: Jan. 9, 1984

[51] Int. Cl.[3] ............................. A23L 1/09; A23L 1/04
[52] U.S. Cl. ..................................... 426/613; 426/658; 426/654; 426/804
[58] Field of Search ................. 426/658, 654, 613, 804

[56] References Cited

U.S. PATENT DOCUMENTS

| | | | |
|---|---|---|---|
| 3,057,734 | 10/1962 | Pader | 426/658 |
| 3,282,707 | 11/1966 | Topalian | 426/658 |
| 3,362,833 | 1/1968 | Smith | 426/658 |
| 3,914,440 | 10/1975 | Witzig . | |
| 4,073,963 | 2/1978 | Daggy | 426/658 |
| 4,152,466 | 5/1979 | Deretchin | 426/658 |
| 4,219,572 | 8/1980 | Jackman | 426/658 |
| 4,394,399 | 7/1983 | Keyser et al. | 426/658 |
| 4,401,648 | 8/1983 | Piechota . | |
| 4,443,482 | 4/1984 | Schopf | 426/658 |

OTHER PUBLICATIONS

Kelco Xanthan Gum brochure, 2nd Edition, p. 29.
Kelcoloid Propylene Glycol Alginates, Technical Bulletin DB-5.
H. D. Graham "Food Colloids", The AVI Publishing Company, 1977, p. 448.
"Gordian", vol. 80, No. 9, pp. 200, 203–204 (1980).
"Progress in Food and Nutrition Science", vol. 6, Gums and Stabilisers for the Food Industry–Interactions of Hydrocolloids, Pergamon Press (1982), particularly p. 81.

Primary Examiner—Jeanette Hunter
Attorney, Agent, or Firm—Milton L. Honig; James J. Farrell

[57] ABSTRACT

A reduced calorie edible syrup containing a mixture of alginate and clarified xanthan gum is provided which exhibits special thickening and organoleptic properties. Butter containing syrups with this gum combination exhibit good phase stability.

13 Claims, No Drawings

LOW CALORIE SYRUP

BACKGROUND OF THE INVENTION

1. Field of the Invention

The invention relates to a reduced calorie edible syrup having enhanced emulsifying, thickening and organoleptic properties.

2. The Prior Art

Consumers are counting their calories. Yet, they find it difficult to forego the taste of syrup toppings needed to enhance a waffle or pancake. Industry has recognized the need but encountered problems in producing low calorie syrups with properties similar to the older, high caloric variety. To gain consumer acceptance, a low calorie syrup must meet a number of criteria. It should resemble conventional syrup in flavor impact, smooth mouthfeel and thickness. The syrup must be pourable and have a relatively stable viscosity which does not undergo signicant change during storage. Finally, to meet the standard of identity, the syrup must contain no more than 43.3% by weight of soluble sweetener solids.

Some syrups contain a small amount of butter to enhance flavor. Phase stability problems are particularly aggravated when this ingredient is present. At least partial separation of phases frequently occurs. Not only is it aesthetically unpleasing, but shaking the bottle by the consumer cannot completely re-emulsify butter with aqueous phase.

Reduced calorie table syrups have been disclosed in U.S. Pat. No. 4,394,399 which derive their emulsion stability and thickness from the presence of carboxymethyl cellulose gum. However, these products have problems. To achieve pourable syrups with adequate thickness, carboxymethyl cellulose gum must be used at levels approaching 1%. With such adequately thickened cellulose gum syrups, a slimy mouthfeel, stringiness and/or flavor masking occurs.

U.S. Pat. No. 3,057,734 discloses alginate esters as especially suitable emulsifiers for buttered oil-in-water emulsion table syrups. The syrups of the patent are inherently viscous requiring but little thickening gum. In contrast, the instant low calorie liquids need higher levels of alginate gum, circa 2%, to achieve an appropriate thickness. These high levels are undesirable for cost reasons.

Accordingly, it is an object of this invention to provide a syrup with reduced calories comparable to traditional syrups in viscosity, stability, pourability, mouthfeel and flavor impact.

A further object of this invention is to provide a buttered reduced calorie syrup having acceptable phase and viscosity stability, pour and organoleptic properties.

SUMMARY OF THE INVENTION

A low calorie edible syrup is provided comprising:
(i) from about 10 to 43.3% sugar solids by weight of total syrup, in water;
(ii) from about 0.01 to 1% of alginate gum;
(iii) from about 0.01 to 1% of clarified xanthan gum; and
(iv) from about 0.01 to 1% of edible preservative.

DETAILED DESCRIPTION OF THE INVENTION

It has been discovered that low calorie syrups can be thickened and emulsion stabilized with a combination of alginate and clarified xanthan gum. In combination, the gums provide better organoleptic properties and thickening ability at lower total concentration than either of the gums individually.

When formulating butter into the reduced calorie compositions of the instant invention, there is the additional difficulty of suspending butter in the aqueous environment. Carboxymethyl cellulose, propylene glycol alginate and mixtures of these two gums were found to be ineffective emulsifiers. Butterfat separated from the aqueous system as dark swirls within the syrup during pouring or as globules in the neck of the syrup bottle. Surprisingly, it was found that even relatively low concentrations of an alginate and clarified xanthan gum combination remedied the separation problem. Furthermore, the combination provided a high viscosity syrup with a smooth mouthfeel.

Consumers expect their table syrups to have body with a thickness that will allow adherence to the treated substrate food, e.g., waffles or pancakes. These syrups must be substantially thicker than water but sufficiently fluid to be pourable even after standing at refrigerator temperature. Accordingly, the desired viscosity range is from about 850 to 1100 cps (Brookfield RVT) at 70° F. The pH of the instant syrup compositions should range from about 4.0 to 5.0, preferably 4.3 to 4.6.

Algin, the generic description for salts of alginic acid, occurs in all members of the class Phaeophyceae, brown seaweed, as a structural component of the cell walls. Alginic acid contains D-mannuronic and L-guluronic acids. Alginates include the sodium, potassium, ammonium and mixed salts of alginic acid and ester derivatives. Particularly preferred are high viscosity propylene glycol alginates, commercially available from the Kelco Company of California under the trademark Kelcoloid HVF. Alginate gum may be present from about 0.01 to 1% by weight of the final formulation. Preferably, it is present from about 0.1 to 0.4%.

Xanthan gum is a polysaccharide produced by the bacterium Xanthomonas campestris. The gum consists of mannose, glucose and glucuronic acid as a mixed potassium, sodium and calcium salt. It is important to utilize a clarified variety of xanthan gum which has been purified by filtration to remove particulate matter. Clarified xanthan gum provides transparent syrup formulations; non-clarified gum results in a cloudy syrup. Xanthan gum is present from about 0.01 to 1% by weight of the total formulation. Preferably, the concentration is from about 0.1 to 0.4%.

Clarified xanthan gum should be present in lesser amounts than the high viscosity alginate gum, i.e., Kelcoloid HVF. Too much xanthan gum imparts a gel-like inferior appearance to the syrup. Moreover, in contrast to xanthan gum, excess Kelcoloid HVF provides a more appealing mouthfeel. Accordingly, the ratio of alginate to xanthan gum should range from 10:1 to about 1:1, preferably 2:1 to about 1:1.

Syrups of the present invention should contain no more than about 65 calories per fluid ounce. Also, it is desirable to avoid artificial sweetening agents. Sugar is present as the primary sweetening agent. Among the types of sugar suitable are cane or beet sucrose, glucose, maltose, fructose, high or low conversion corn syrups and molasses. The sugar is used in an amount such that the total sugar solids content of the product does not exceed 43.3% by weight. Sugar solids may range from about 10% to 43.3%. Preferably, the total is maintained within the range of about 40 to 43.3% by weight. Lower amounts of sugar can be used with a corresponding reduction in sweetness. Except for the other ingredients disclosed in their specified amounts, water constitutes the balance of the syrup formulation. Sugar and water are the principal ingredients in these compositions which are aqueous based formulations containing no fat other than butter as contrasted with prior art oil-in-water emulsions.

To ensure microbiological stability, a small amount of edible preservative is added to the composition. Illustrative of the preservative is sodium benzoate, sorbic acid and mixtures thereof. The preservative is present in an amount from about 0.01 to 1% by weight of the total syrup. Preferably, it is present from about 0.1 to 0.5%.

Any flavoring ingredient contributing a pleasant taste can be added to the compositions of this invention. Flavoring agents such as natural or artificial maple flavor, natural or artificial butter, butterscotch, nut, caramel or any other food flavor may be present. Their concentrations range from about 0.01 to about 1% by weight of total syrup. Salt may be present in the formulations in an amount from about 0.1 to 1% to accentuate sweetness.

Acidulents and buffers may be present in the syrups. For example, sodium citrate is useful in adjusting pH. These type ingredients are found in amounts ranging from 0.01 to 1.0%.

Anti-flocculents and sugar anti-crystallization additives may be deemed necessary in certain formulations. Sodium hexametaphosphate serves both purposes and, therefore, is frequently utilized. Cap-lock caused by sugar crystallization is avoided by incorporating this additive. Heavy metals that may exist in the composition are tied-up by sodium hexametaphosphate thereby preventing flocculation. Amounts of these additives generally range from 0.001 to 0.5%; preferably, from 0.01 to 0.10%.

A particularly attractive product is obtained when small amounts of butter are incorporated. Lipolyzed butter or lightly salted butter are especially suitable. Butter may be present from about 0.01 to 0.9% by weight of the syrup. Preferably, the butter is present from about 0.1 to about 0.5%.

To maintain good stability at high storage temperature, certain process steps must be followed for both non-buttered and buttered syrup products. Salts must be kept away from the gum dispersion process because salts will inhibit the hydration of gum. Salts should be added directly to preheated sugar syrup. Accordingly, the method for preparing formulations of the instant invention involves heating the sugar solids between 140° F. and 180° F. and then adding the edible preservative(s). In a separate vessel, flavorants are dissolved in hot water. Xanthan gum is then slowly dispersed into the aqueous solution under agitation with high speed mixers. The aqueous gum mixture is then transferred into the sugar syrup composition. For flavor development purposes, the combination is heated for one hour at around 180° F.

Alginates should not be exposed to high temperatures for any long time period. High temperatures cause the structural components of the alginate gum to weaken resulting in a less viscous and unstable product. Unlike propylene glycol alginates, the viscosity contributed by xanthan gums is unaffected by prolonged exposure to high temperatures. To avoid subjecting alginate to prolonged heating, a pre-solution of alginate gum dispersed in water is separately prepared. The alginate blend is transferred into the sugar syrup-xanthan gum mixture subsequent to the one hour, 180° F. cook. The alginate-xanthan-sugar composition is mixed for a minimum of 10 minutes, preferably 15 minutes. This mixing time is highly critical to obtain a homogeneous mixture and assurance of complete hydration. Typically, the amounts of water added with xanthan and alginate gum are about 21% and 15%, respectively.

The final stage of preparation includes a homogenization step. Where butter fat is present, homogenization breaks down any globules to below one micron size. Both fat and non-fat containing syrups have their long term viscosity stability improved by homogenization. Homogenization is normally performed at two stages, the first stage taking place at a higher pressure than the second stage. For instance, the first and second stage pressure can be maintained at about 2500 and 500 psi, respectively. Product is hot filled and then cooled.

The following examples will more fully illustrate the embodiments of this invention. All parts, percentages and proportions referred to herein and in the appended claims are by weight unless otherwise indicated.

EXAMPLE I

Illustrative of a maple flavored syrup is the composition outlined in Table 1. It contains a combination of Kelcoloid HVF, a propylene glycol alginate ester, and a clarified xanthan gum.

TABLE 1

| Ingredient | Weight % |
|---|---|
| Sugar Syrup (43% total solids) | 62.6 |
| Water | 35.64 |
| Clear Xanthan Gum | 0.21 |
| Kelcoloid HVF | 0.23 |
| Salt | 0.30 |
| Sodium Benzoate | 0.10 |
| Sorbic Acid | 0.15 |
| Sodium Citrate | 0.10 |
| Molasses | 0.30 |
| Artificial Maple Flavor | 0.37 |
| Sodium Hexametaphosphate | 0.05 |

The syrup of Table 1 had a viscosity of 1010 cps as measured by a Brookfield RVT viscometer at 70° F. The pH was 4.5 and Brix value was 43.7°. This product maintained its stability and viscosity after storage for a period of 8 weeks at 105° F., 90° F. and 70° F. Taste testing panels indicated this to have a smooth mouthfeel, excellent flavor impact and good pourability.

EXAMPLE II

An illustration of a buttered, maple flavor syrup is presented in Table 2.

TABLE 2

| Ingredient | Weight % |
|---|---|
| Sugar Syrup (43% total solids) | 62.60 |
| Water | 35.42 |
| Butter | 0.23 |
| Clear Xanthan Gum | 0.22 |
| Kelcoloid HVF | 0.20 |
| Salt | 0.30 |
| Sodium Benzoate | 0.10 |
| Sorbic Acid | 0.15 |
| Sodium Citrate | 0.10 |

TABLE 2-continued

| Ingredient | Weight % |
|---|---|
| Molasses | 0.30 |
| Artificial Maple Flavor | 0.28 |
| Natural Maple Flavor | 0.05 |
| Sodium Hexametaphosphate | 0.05 |
| Maltol | 0.0005 |

The syrup of Table 2 had a viscosity of 1000 cps as measured with a Brookfield RVT viscometer at 70° F. The pH was 4.4 and Brix value was 44°. Storage stability over a period of 10 weeks at 90° F. and 70° F. was excellent. Panel taste tests indicated that the product had good pourability, smooth mouthfeel and excellent flavor impact.

EXAMPLES III–VII

A number of comparative experiments were performed to evaluate the properties of sodium carboxymethyl cellulose as the gum in the instant formulations. Results of these experiments are outlined below in Table 3. None of the formulations in the table were fully satisfactory. CMC 9M31F, a medium viscosity sodium carboxymethyl cellulose of 0.80 to 0.95 degree of substitution, must be present at higher than 1% to achieve the desired viscosity of greater than 850 cps. Formulation IV with 1.05% CMC 9M31F had a poor mouthfeel. A buttered syrup containing 0.9% CMC 9M31F experienced phase separation both at room temperature and at 90° F.

CMC 9H4XF, a high viscosity carboxymethyl cellulose having 0.80 to 0.95 degree of substitution, provided an inferior thickening effect (500 cps) when combined with the formulation at 0.4%.

CMC 7H4XF, a high viscosity carboxymethyl cellulose with 0.65 to 0.85 degree of substitution, was a more efficient thickener than the aforementioned two other varieties of CMC. At 0.5%, CMC 7H4XF provided an acceptable viscosity syrup. However, this gum masked the maple flavor of the syrup. Poor mouthfeel was also experienced. Buttered formulations with CMC 7H4XF at 0.5% gum experienced phase separation after storage for one month at room temperature.

TABLE 3

| | Comparative Examples | | | | |
|---|---|---|---|---|---|
| Ingredients | Example III | Example IV | Example V | Example VI | Example VII |
| Sugar Syrup | 62.6 | 62.6 | 62.6 | 62.6 | 62.6 |
| Water | 34.76 | 34.68 | 35.33 | 35.53 | 35.18 |
| Butter | 0.75 | — | — | — | 0.02 |
| CMC 9M31F | 0.90 | 1.05 | — | — | — |
| CMC 9H4XF | — | — | 0.4 | — | — |
| CMC 7H4XF | — | — | — | 0.5 | 0.5 |
| Buttermilk/emulsifier | — | — | — | — | 0.48 |
| Salt | 0.3 | 0.3 | 0.3 | 0.3 | 0.3 |
| Sodium Benzoate | 0.1 | 0.1 | 0.1 | 0.1 | 0.1 |
| Sorbic Acid | 0.15 | 0.15 | 0.15 | 0.15 | 0.15 |
| Sodium Hexametaphosphate | 0.05 | 0.05 | 0.05 | 0.05 | 0.05 |
| Citric Acid | — | 0.02 | 0.02 | — | — |
| Molasses | 0.60 | 0.3 | 0.3 | 0.3 | 0.60 |
| Flavorant | 0.17 | 0.75 | 0.75 | 0.47 | — |
| Viscosity (cps at 70° F.) | 625 | 800 | 500 | 1150 | 1125 |
| Comments | Separation | Poor Mouthfeel | — | Poor Mouthfeel Flavor Masked | Separation |

The foregoing description and examples illustrate selected embodiments of the present invention and in light thereof variations and modifications will be suggested to one skilled in the art all of which are in the spirit and purview of this invention.

What is claimed is:

1. A low calorie edible syrup comprising:
   (i) from about 10 to 43.3% sugar solids by weight of total syrup, in water;
   (ii) from about 0.01 to 1% of alginate ester;
   (iii) from about 0.01 to 1% of clarified xanthan gum; and
   (iv) from about 0.01 to 1% of edible preservative wherein the ratio of alginate to xanthan gum ranges from 10:1 to about 1:1.
2. A composition according to claim 1 further comprising from about 0.01 to 0.9% butter.
3. A composition according to claim 2 wherein the butter is present from about 0.1 to about 0.4%.
4. A composition according to claim 1 wherein the alginate ester is a high viscosity propylene glycol alginate ester.
5. A composition according to claim 1 wherein the sugar solids range from about 40% to 43.3%.
6. A composition according to claim 1 wherein the preservative is sodium benzoate, sorbic acid or mixtures thereof.
7. A composition according to claim 1 further comprising about 0.01 to 1% of flavorant.
8. A composition according to claim 7 wherein the flavorant is natural or artifical maple, natural or artificial butter and mixtures thereof.
9. A composition according to claim 1 wherein the viscosity ranges from about 850 to 1100 cps measured by a Brookfield RVT viscometer at 70° F.
10. A process for preparing a low calorie edible syrup comprising:
    (i) heating from about 10 to 43.3% sugar solids by weight of total syrup, in water;
    (ii) dispersing slowly in a second vessel about 0.01 to 1% clarified xanthan gum, by weight of total syrup, into hot water using high speed mixers;
    (iii) transferring the aqueous xanthan gum mixture into the sugar syrup and heating;
    (iv) preparing separately a blend of about 0.01 to 1% alginate ester dispersed in water; and
    (v) transferring the alginate gum dispersion into the xanthan-sugar syrup blend and mixing for a minimum of 10 minutes.
11. A process according to claim 10 wherein the xanthan gum-sugar syrup composition is heated for about one hour at about 180° F.
12. A process according to claim 10 wherein the resultant syrup is homogenized.
13. A process according to claim 10 wherein about 0.01 to 1% edible preservative is added to the sugar solids in step (i).

* * * * *